US006155109A

United States Patent [19]

Supak

[11] Patent Number: 6,155,109

[45] Date of Patent: Dec. 5, 2000

[54] SYSTEM AND METHOD FOR MEASURING PISTON RING ROTATION

[75] Inventor: Wayne A. Supak, Washington, Ill.

[73] Assignee: Caterpillar Inc., Peoria, Ill.

[21] Appl. No.: 08/996,285

[22] Filed: Dec. 22, 1997

[51] Int. Cl.[7] .................... G01M 15/00; G01M 19/00; G01L 3/26

[52] U.S. Cl. .................... 73/120; 73/117.3; 73/118.1

[58] Field of Search .................... 73/120, 119 R, 73/47, 49.7, 117.2, 117.3, 862.636; 76/116

[56] References Cited

U.S. PATENT DOCUMENTS

| | | | |
|---|---|---|---|
| 4,143,319 | 3/1979 | Rouam | 73/120 |
| 4,987,774 | 1/1991 | DeWaal | 73/120 |
| 5,062,298 | 11/1991 | Falcoff et al. | 73/597 |
| 5,258,930 | 11/1993 | Fukuyoshi | 73/120 |
| 5,497,669 | 3/1996 | Hafner | 73/862.636 |
| 5,744,705 | 4/1998 | Derouen et al. | 73/119 R |

FOREIGN PATENT DOCUMENTS

| | | |
|---|---|---|
| 2543078 | 3/1977 | Germany . |
| 868324 | 9/1981 | U.S.S.R. . |
| 1257491 | 9/1986 | U.S.S.R. . |

OTHER PUBLICATIONS

Haussler—"Sensor for Magnetically Scanning a Moving Element in an Internal Combustion Engine"—Nov. 26, 1996.

Rodriguez—"Method & Apparatus for Testing Piston Rings"—May 27, 1997.

Takegami—"Cylinder Discriminating Sensor Layout"—Mar. 15, 1994.

Ginns—"Engine Monitoring System"—Aug. 20, 1985.

Scourtes—"Methods & Apparatus for Testing Engines"—May 23, 1995.

*Primary Examiner*—Benjamin R. Fuller
*Assistant Examiner*—Octavia Davis
*Attorney, Agent, or Firm*—Steven G. Kibby

[57] ABSTRACT

A system and method for measuring end gap position and rotation of rings on a piston reciprocating in an engine cylinder. Eddy current induction detectors are installed in ports extending through the cylinder wall spaced around the circumference. Signals are collected from each detector over a portion of the engine cycle for a number of revolutions, and the end gap position is associated with a detector having a significant variation in sensed induction currents.

13 Claims, 3 Drawing Sheets

SYSTEM AND METHOD FOR MEASURING PISTON RING ROTATION

TECHNICAL FIELD

The present invention relates to measuring piston ring rotation during engine operation, and more particularly to a system and method for utilizing a plurality of eddy current sensors circumferentially mounted though a cylinder to locate piston ring end gaps within the cylinder.

BACKGROUND ART

Rotational movement of piston rings is an important, yet poorly understood, parameter in engine operation and durability. Gap position of the top compression ring has been shown to affect hydrocarbon exhaust emissions, and alignment of ring gaps is thought to cause an increase in oil consumption. The absence of piston-ring rotational movement in diesel engines can cause localized wear and carbon deposits, while excessive rotational movement can contribute to high wear on the ring sides.

Ring rotation is driven only by transient forces which can not readily be taken into account in a new or modified engine design. Accordingly, it is advantageous to be able to measure ring rotation while the engine is operating in order to evaluate ring performance and diagnose the cause of rotational movement outside an acceptable range. In an SAE paper by the Research Laboratories of the General Motors Corporation, entitled "A Method for Measurement of Piston Ring Rotation", Schneider et al. suggest tracking ring rotation with a portable germanium detector. In order to overcome the inability of existing methods, having two Geiger counters/one source or one detector/two identical sources, to determine direction of rotation, the authors inserted in the piston ring a radioactive cobalt wire near the end gap, and a zinc wire at approximately a one hundred twenty degree spacing. In addition to difficulties with handling and decay of radioactive materials, the system is able to monitor only a single piston ring per cylinder.

U.S. Pat. No. 4,143,319 to Rouam teaches using an eddy current detector in the cylinder wall to monitor the degree of wear for a wear-resistant piston ring coating, such as chromium. A decreased thickness of the low permeability chromium layer causes the eddy currents generated in the high permeability steel ring to exceed a predetermined threshold. The patent further suggests that a deformation of the piston ring can be detected by a lack of coincidence in the measurements produced by two detectors mounted in the cylinder in diametric opposition.

U.S. Pat. No. 5,258,930 to Fukuyoshi et al. discloses a similar system but compares the induction detected in the coated top ring to that in the lower non-coated rings. The patent further suggests in alternative embodiments that the portion of the ring which is worn can be determined by varying the location of a coated notch in the ring around the circumference.

While the foregoing eddy current detector arrangements may provide some information about end gap position, the effect of signal noise and thermal or elastic calibration slippage make small variations in the detector output an unreliable indicator of position.

Despite the foregoing difficulties, eddy-current systems are generally immune to environmental contaminants such as oil, water dirt and dust prevalent with internal combustion engines. Accordingly, it is an object of the present invention to provide safe, reliable measurement of piston ring rotation by use of inductive detectors.

It is another object to permit simultaneous rotation measurement of multiple piston rings within a cylinder to permit determination of whether the end gaps are in alignment.

It is still another object of the invention to measure piston ring rotation using conventional piston rings. This helps ensure similar results will be achieved in unmodified rings used in production engines.

DISCLOSURE OF THE INVENTION

These and other objects may be achieved by a system and method according to the present invention for measuring end gap position and rotation of rings on a piston reciprocating in an engine cylinder. Eddy current detectors are installed in ports extending through the cylinder wall spaced around the circumference. Signals are collected from each detector over a portion of the engine cycle for a number of revolutions, and the end gap position is associated with a detector having a significant variation in sensed induction currents.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

BEST MODE FOR CARRYING OUT THE INVENTION

Figure 1:
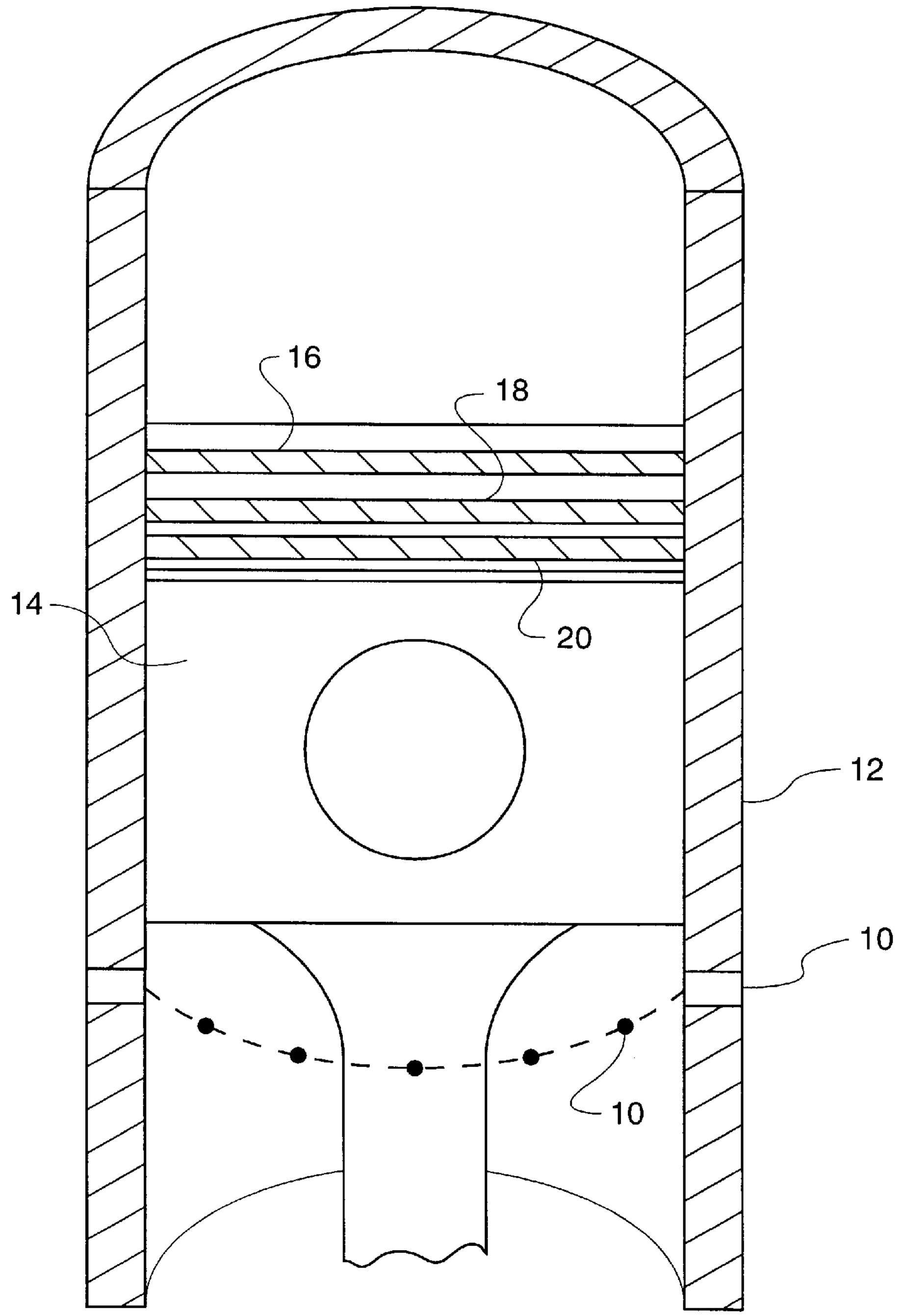
FIG. 1 schematically illustrates placement of sensors around the periphery of a cylinder.

Turning now to the drawings and referring first to FIG. 1, an engine cylinder 12 encloses a piston 14 having a number of piston rings 16, 18, and 20 sealing the space between the piston and the inner wall of cylinder 12. The present invention is applicable to cylinders bored directly into an engine block (not shown), but typically cylinder 12 is a rolled steel liner inserted into the block. The rings are typically made of steel formed into a broken circle slightly larger than the inner diameter of cylinder 12, thereby providing sufficient deformation tension to cause the ring to press against the cylinder wall 12 when inserted.

Rings 16,18, and 20, referred to herein as the compression, scraper, and oil rings respectively, are of sufficient thickness to encircle piston 14 within notches formed therein to prevent lateral movement of the ring in the direction of reciprocation within the cylinder. The foregoing ring structure necessarily generates a gap between the broken ends of each ring, detectable as a low permeability portion responsive to high frequency electromagnetic fields produced by an eddy current induction detector 10.

Cylinder 12 has a plurality of detectors 10 installed through ports formed entirely through the cylinder wall 12. The detectors are spaced around a circumference of the cylinder 12, illustrated by dots on a dashed line in the cutaway portion of cylinder 12 in FIG. 1. In a preferred embodiment, eighteen detectors are equally spaced at twenty degree intervals around the cylinder circumference on an axial plane. An axial plane is selected which permits each of the piston rings 16,18 and 20 to pass by the detectors during the course of an engine stroke. Induction detectors from Kaman Industries are suitable for this application, installed in tapped quarter-inch holes to within a maximum of three millimeters of the inside wall of cylinder 12. The detectors 10 may be additionally fixed in position with a high temperature epoxy or other means to prevent micro-movement due to engine vibration.

Figure 2:
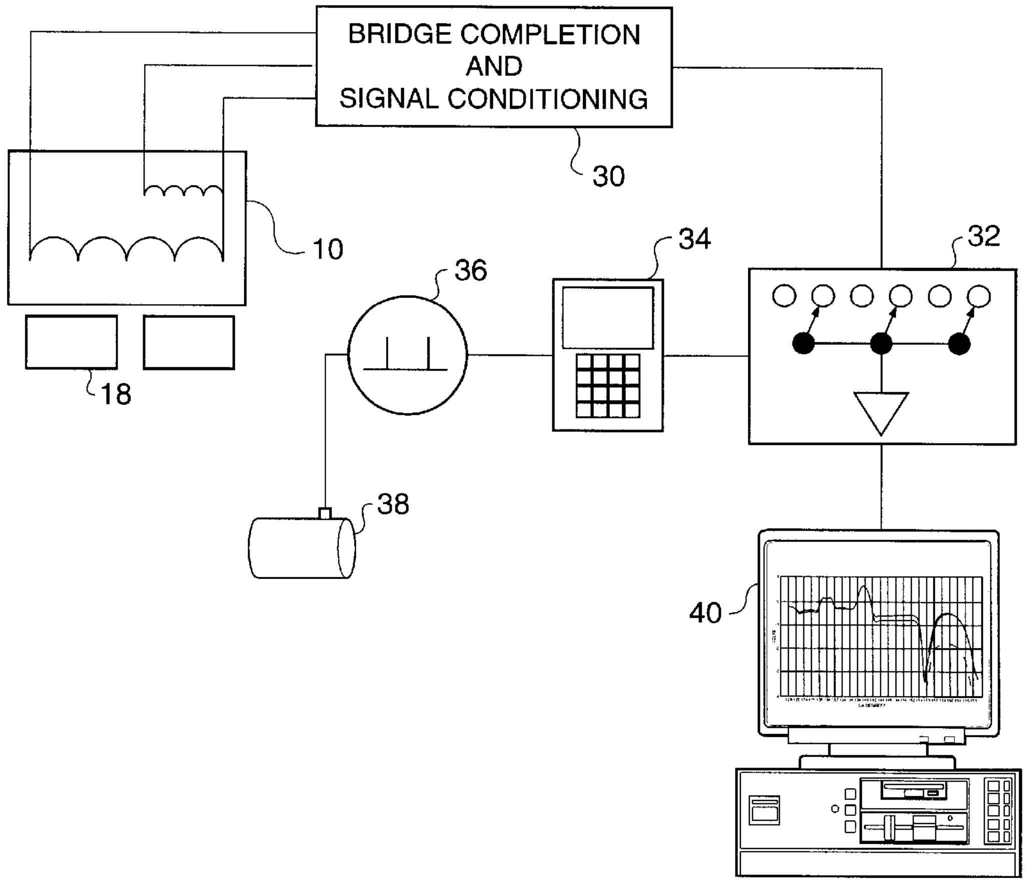
FIG. 2 is a block diagram showing a signal sensing and data acquisition system according to the present.

FIG. 2 illustrates in block form signal conditioning and data acquisition apparatus for determining end gap positions from eddy current signals produced by a plurality of induction detectors. Detector 10 is provided a high frequency signal on a primary winding, which produces an electromagnetic field applied to a piston ring 18 as it passes the face of the detector. The electromagnetic field in turn produces eddy currents in the ring 18 detectable by a secondary winding of the detector 10, having a magnitude dependent upon the presence or absence of the ring end gap near the exposed face of the detector.

Signals produced by each detector are conditioned by a known in the art bridge completion and signal conditioning block 30, before being supplied to a multiplexed analog to digital (A/D) converter 32. Signals sampled by A/D converter 32 are processed by a computer 40 to determine ring rotation information such as end gap position and rate of rotation as described hereinafter.

In order to substantially limit the amount of data processed by computer 40, only signals produced during a selected portion of the engine rotation are sampled. An engine encoder 38 produces a series of pulses 36 in correspondence with the rotation of the crankshaft. A digital timing box 34 associates those pulses 36 with degrees of rotation of the crankshaft from an origin representing top-dead-center for the piston in the cylinder under test. Since each of a plurality of detectors are attempting to locate the ring end gaps, multiplexer and A/D sampler 32 repeatedly sequences through the eighteen detector channels to sequentially supply sampled values to computer 40.

Only during a portion of each engine revolution will one of the rings 16, 18, or 20 be in the axial plane of the detectors 10. Accordingly, a user selectable trigger angle determines the engine position when data acquisition begins, and a user selected frame determines the number of degrees over which the data will be collected. For example, for an encoder producing 900 pulses per revolution, a trigger angle of one-hundred twenty-four degrees, and a frame of fifty degrees, one hundred twenty-five points will be sampled, through a position of one hundred seventy-four degrees, for each detector.

Data acquisition may be selected in a first mode to occur for only a single revolution, but in order to locate end gaps preferably operates in a second mode to record a plurality of revolutions. For each detector, one channel of data is produced having multiple sequences of sampled data over the same range of engine rotation. Each sequence has a range of data points corresponding to the period over which one ring is passing the detector, and a midpoint within that range when the detector output: is likely to be most consistent. According to a preferred embodiment of the present invention, one consistent point is selected for each ring from the corresponding data for the plurality of sequences.

The mean or average of the selected points is calculated for each ring on each channel. The data for each ring is then evaluated to determine whether there is a substantial deviation from the average for data points on one channel, corresponding to a located end gap. By repeating the above operation for further sequences of multiple revolutions of the engine, the rate of rotation for each ring may be determined according to the present invention.

INDUSTRIAL APPLICABILITY

The operation of the present invention is best described in relation to its use in a cylinder of a diesel engine having eighteen detectors circumferentially spaced apart by substantially equal amounts. Data is typically collected and averaged in groups of five hundred engine revolutions to identify one end gap position for each ring.

Figure 3:
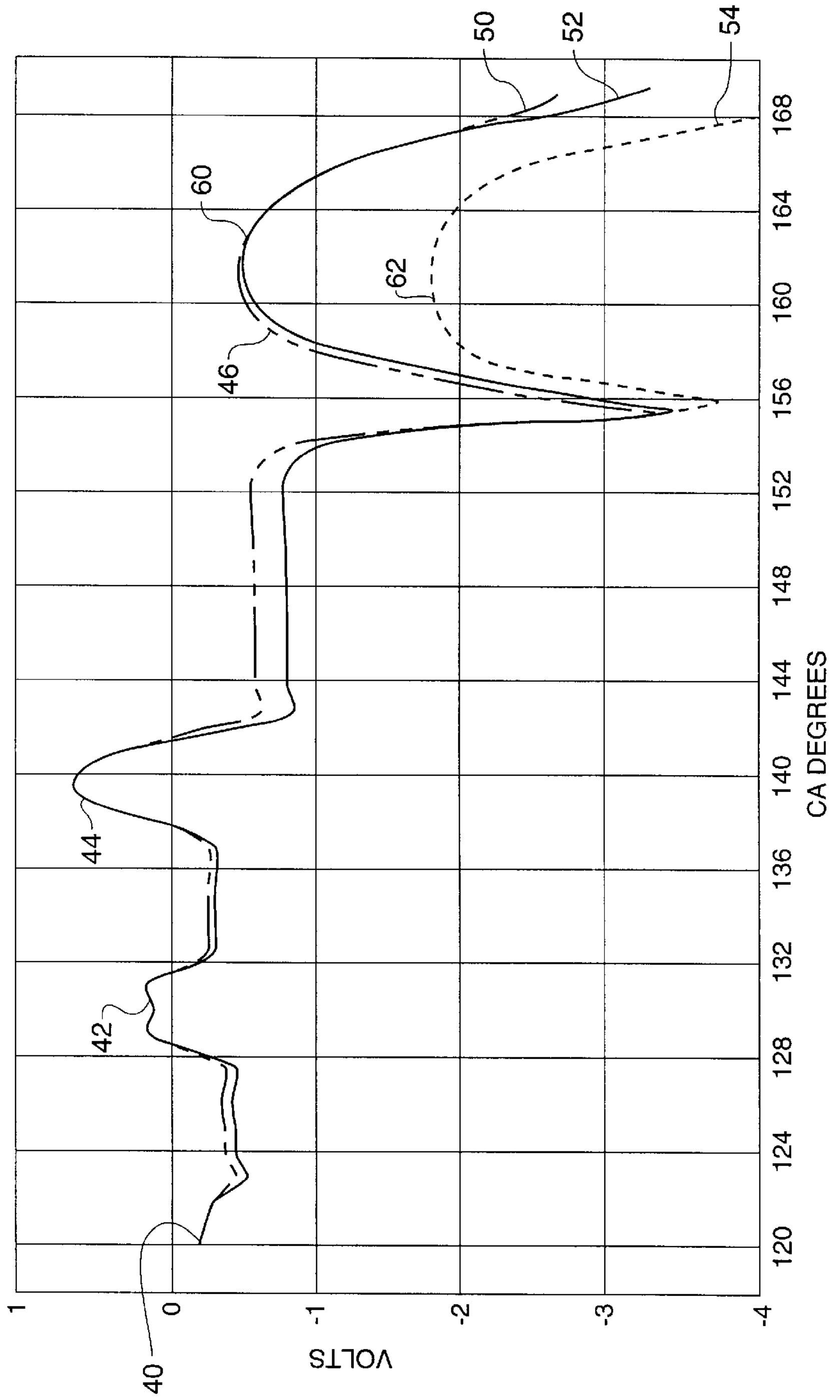
FIG. 3 illustrates eddy currents measured by an inductive sensor according to the invention, in which three cycles of a piston having three rings are shown.

FIG. 3 illustrates data collected from one detector over three engine revolutions 50, 52 and 54, where one hundred twenty degrees from TDC is the trigger point 40 and the frame is fifty degrees wide. The graph illustrates three, substantially parabolic, increases in the data, corresponding to the range 42 when the oil ring 20 passed the detector, the range 44 for the scraper ring 18, and the range 46 for the compression ring 16.

It is clear from the data that there is no substantial deviation during the three sequences at a midpoint of one hundred thirty degrees in the range 42 for the oil ring 20, nor at the midpoint of one hundred forty degrees for the midpoint of range 44 corresponding to the scraper ring. In the case of the midpoint of one hundred sixty-two degrees in the range 46 corresponding to the compression ring 16 however, the sequence 62 has a magnitude 62 substantially below the magnitude 60 for sequences 50 and 52, indicating an end gap of the top ring 16 is located near the corresponding detector 10.

Typically, the end gap will be located in front of a detector for substantially more than one revolution in a group of five hundred measured sequences. In fact, is the end gap may be so located in a majority of the detected sequences, whereby the deviation detected corresponds to one or more sequences substantially above the mean or average. According to one embodiment of the present invention, a minimum, maximum and average value for each group are compared to determine whether the difference indicates the presence of an end gap. Other statistical analysis, such as standard deviation, will also clearly be applicable. The detectors are preferably calibrated by alternately placing a solid portion and an end gap of a ring in front of each detector and adjusting for a one volt change therebetween.

Only when the end gap remains substantially stable in front of a given detector for the entire group of sequences will the system be unable to detect the end gap as described. In such an instance however, positions determined from prior and subsequent groups may be used to interpolate the unidentified position. Also, the averages for the selected data points may be compared to averages from other detectors, or from prior groups on the same detector, to identify a significant change indicating the presence or absence of an end gap.

The encoder may at times lose track of the top dead center position and collect data from other than the ranges 42,44, and 46 corresponding to a ring passing in front of the detector. Accordingly, the system routinely checks the data for a given channel, such as channel zero, against predetermined valid values for each ring, throwing out the entire file of data for that group of revolutions if the sum of the differences exceeds a preset amount, such as 0.5 volts.

The angular position of the end gap for a given ring may be derived according to the disclosed example by multiplying an identified detector channel number by twenty degrees, corresponding to the separation between rings, where channel zero corresponds to an arbitrary position of zero degrees. Once a series of end gap positions are determined, useful information such as whether the rings are in alignment with one another or the rate of rotation, may readily be determined using well known techniques.

While certain present preferred embodiments of the invention have been illustrated and described herein, it is to be distinctly understood that the invention may be otherwise variously embodied and practiced within the scope of the following claims.

What is claimed is:

1. A system for measuring end gap rotation of rings on a piston reciprocating in a cylinder, comprising:

a plurality of induction detectors installed in ports extending through a wall of the cylinder and circumferentially spaced apart in an axial plane crossed by each ring during the piston reciprocation, said detectors each generating a signal representative of eddy currents produced when said rings cross said axial detector plane;

means for sampling said eddy current signals to generate a channel of digital data corresponding to each detector signal;

means for associating an end gap position for each ring with one said channel corresponding to a given said detector signal; and means for identifying said one channel based upon a substantial deviation among said data.

2. A system as set forth in claim 1, wherein the piston reciprocation occurs during operation of an internal combustion engine, said sampling means including:

an encoder generating pulses responsive to engine revolution;

digital timing means responsive to said pulses for enabling said digital sampling of said eddy current signals during only a selected portion of said engine revolution.

3. A system as set forth in claim 2, said timing means further comprising:

means for selecting a trigger angle corresponding to an angle of said engine revolution to begin enabling said digital sampling, and a frame corresponding to a duration of said digital sampling; and wherein said sampling means generates a sequence of eddy current data points for each detector during each engine revolution.

4. A system as set forth in claim 1, further comprising said identifying means:

selecting data points from each channel corresponding to a midpoint of each ring crossing said axial plane, calculating average values of said selected data points for each ring, identifying for each ring one channel having data points differing substantially from said average values.

5. A system as set forth in claim 1, wherein said detectors are substantially equally spaced apart around said circumference.

6. A system as set forth in claim 1, wherein eighteen of said detectors are installed at twenty degree separation around said periphery.

7. A method of measuring end gap rotation of rings on a piston reciprocating in a cylinder, comprising the steps of:

providing a plurality of induction detectors in ports extending through a wall of the cylinder and positioned circumferentially spaced apart in an axial plane crossed by each ring during the piston reciprocation;

selecting sampled data points representing eddy current values sensed by each detector during sequential periods as each ring crosses said axial detector plane; and identifying as an end gap position for each ring the circumferential position of one of said plurality of detectors having a significant variation from the values of said selected data points sensed by the remainder of said plurality.

8. The method of claim 7, wherein said end gap position for each ring is identified from deviations among sensed eddy current from a plurality of cycles of said piston reciprocation.

9. The method of claim 7, wherein said eddy currents are sampled from eighteen detectors substantially evenly spaced around said circumference.

10. The method of claim 7, further comprising:

calculating a mean value of said selected data points for each detector and for each ring; and identifying as a said end gap position the position of a detector having data points differing substantially from said calculated mean value for that detector and ring.

11. The method of claim 7, further comprising:

identifying said detector having a substantial variation by calculation of a standard deviation among data points for a given detector and ring.

12. A method as set forth in claim 7, wherein the piston reciprocation occurs during operation of an internal combustion engine, said sampling further comprising:

generating encoder pulses responsive to engine revolution;

sampling said eddy currents during only a selected portion of said engine revolution responsive to said encoder pulses.

13. A method as set forth in claim 7, further comprising:

calculating a rate of rotation for each said ring from a plurality of said identified end gap positions.

* * * * *